United States Patent
Tsutsumitake

(10) Patent No.: US 6,480,883 B1
(45) Date of Patent: Nov. 12, 2002

(54) REAL-TIME INFORMATION TRANSMISSION SYSTEM

(75) Inventor: Hideyuki Tsutsumitake, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/342,732

(22) Filed: Jun. 29, 1999

(30) Foreign Application Priority Data

Jun. 30, 1998 (JP) .......................................... 10-199587

(51) Int. Cl.[7] .............................................. G06F 15/16
(52) U.S. Cl. ....................... 709/203; 709/217; 709/218; 709/219; 709/232
(58) Field of Search ................................ 709/203, 217, 709/218, 219, 232

(56) References Cited

U.S. PATENT DOCUMENTS

| | | | | |
|---|---|---|---|---|
| 5,774,670 A | * | 6/1998 | Montulli | 345/835 |
| 5,893,091 A | * | 4/1999 | Hunt et al. | 707/10 |
| 5,925,100 A | * | 7/1999 | Drewry et al. | 709/203 |
| 6,021,437 A | * | 2/2000 | Chen et al. | 709/202 |
| 6,243,761 B1 | * | 6/2001 | Mogul et al. | 709/217 |
| 6,247,056 B1 | * | 6/2001 | Chou et al. | 707/10 |
| 6,289,370 B1 | * | 9/2001 | Panarello et al. | 345/706 |
| 6,304,909 B1 | * | 10/2001 | Mullaly et al. | 709/232 |

* cited by examiner

Primary Examiner—Krisna Lim
(74) Attorney, Agent, or Firm—Finnegan, Henderson, Farabow, Garrett & Dunner, L.L.P.

(57) ABSTRACT

A real-time information transmission system can immediately transmit information updated on a server to a client, even if directly communication between the server and the client is not established. If the server receives a page request from the client, the server returns a requested page to the client. The same connection ID is added to the request from the client and to an associated response from the server. The client analyzes the page. If an event request is included in the analyzed page, the client adds another connection ID to the request and sends it to the server. Using the connection ID, the server sends an event to the client each time the event has occurred. The client processes the event and reflects the processed result on a screen of a display.

12 Claims, 13 Drawing Sheets

```
<HTML>
<HEAD>
<TITLE> SAMPLE PAGE </TITLE>
</HEAD>
<BODY>
<H1> SAMPLE PAGE </H1>
THIS PAGE INCLUDES EVENT REQUEST
<EMBED>
   <EVENT URL=http://abc.def/hij.evt>
</EMBED>
</BODY>
</HTML>
```

FIG. 2

```
<HTML>
<HEAD>
<TITLE> CURRENT MONITOR </TITLE>
</HEAD>
<BODY>
<H1> CURRENT MONITOR SCREEN </H1>
<H2> PRESENT CURRENT VALUE </H2>
<HANDLER type=text name=currency> A
<EMBED>
  <EVENT url=http://abc.def/current period=1 target=currency>
</EMBED>
<H2> STATE OF DEVICE </H2>
<HANDLER type=text value=normal name=valid><HANDLER type=text value=abnormal name=invalid>
<EMBED>
  <EVENT url=http://abc.cef/state target=valid,invalid>
</EMBED>
</BODY>
</HTML>
```

FIG. 8

REAL-TIME INFORMATION TRANSMISSION SYSTEM

BACKGROUND OF THE INVENTION

The present invention relates generally to a client/server type system wherein an information providing server provides information upon request from an information display client, and more particularly to a real-time information transmission system for realizing novel and advantageous information transmission from an information providing server to an information display client.

In these years, the WWW (World Wide Web) has permeated through societies, and various information is provided via the WWW. The WWW is a distributed-type information-provision/information-display system using the Internet, and it comprises servers (information providing servers) and clients. As is well known, a worldwide information network using hypertexts including images and sounds has been constructed by the WWW and utilized by many people.

In general, the server provides information to the client in units of a document called "page". The page is an electronic file described in a format called HTML (Hypertext Markup Language). The client is normally realized with use of a software called "browser" for information display (information browsing), and the browser accesses the server to acquire and display pages including images and sounds.

In the general use of the WWW, an address (called URL) of a page to be displayed is designated in the browser, and the browser issues a request to the server. The server returns the page corresponding to the address to the browser. It should be noted here that the server performs nothing unless it receives a request from the browser. This means that even if pages stored in the server have been updated, the browser is unable to immediately know the change.

For example, while the browser is displaying pages such as news and weather reports, which are updated in real time, the browser is not informed of the fact that the pages have been updated on the server side. That is, the content of the updated page is not reflected on the display screen of the browser side.

The user on the browser side can immediately know the update of the page stored in the server, if the browser accesses the server periodically. In this case, however, the user needs to periodically re-access the server, for example, by depressing a reload button generally provided in the browser, and this means that a very time-consuming operational load is put on the user.

There is known a mechanism called "smart-pull mechanism" as an example of the mechanism for automatically updating the display of the page on the browser side in accordance with the update of the page on the server side. In the smart-pull mechanism, the browserside operation by the user of positively depressing the reload button is automated. The smart-pull mechanism provides the user with such a feeling that the page updated on the server side is automatically sent to the browser, like TV broadcasting.

There is a mechanism called "push mechanism" as another example of the mechanism for automatically updating the display of the page on the browser side. The push mechanism is provided with means for extending an HTML file provided by the information providing server (WWW server), thereby describing in the HTML file various information relating to the display update of the page. The browser, which has received the extended HTML file, refers to information described in the HTML file, which relates to, e.g. the next update time. If the next update time has arrived, the browser issues a request for provision of the updated page to the server. According to the push mechanism, a useless access to the server can be eliminated and such an effect that the page is updated as if in real time can be obtained with the browser-side processing alone.

As examples of such browsers having the automatic function of periodically accessing the server and being capable of reducing the operational load on the user, "Point Cast" (produced by Point Cast corporation) and "Castanet Tuner" (produced by Marimba corporation) have been provided. These browsers are provided with such devices as enable the user to designate the time interval of automatic update or the browser to receive only different data on the updated page.

In the above-described smart-pull mechanism and push mechanism, it is the browser, and not the server, that updates the display of the page. As mentioned above, even when the page stored in the server has been updated, unless the browser issues a request, the server performs nothing. This characteristic of the client/server system causes some problems described below.

In the smart-pull mechanism, the browser automatically accesses the server on a periodical basis in order to check whether the page has been updated. Although no special attribute is needed in the HTML file constituting the page, the periodical access is repeated unconditionally even if the server-side information is, in fact, not updated, and useless accesses will increase.

On the other hand, the push mechanism is based on the special file (extended HTML file) in which information indicating the next update time is described beforehand as page attribute. Thus, no useless access to the server is performed to check whether the information has been updated on the server side, if it is assumed that the page is actually updated on the server side according to the information on the update time.

However, the push mechanism is effective only in the case where the next update time or timing can be specified in advance. Specifically, in the push mechanism, if it is assumed that the page is updated asynchronously and at a non-specified timing, the update time information cannot be prepared. That is, the client side is unable to know when the automatic update is to be made.

There is a common problem with the smart-pull mechanism and the push mechanism. That is, when the update interval of the page to be provided is very short, e.g. one second, the efficiency of communication processing is very low. The reason is as follows. In general, when communication is started between the server and client, some communication negotiations need to be performed before data is transmitted. In the above example, negotiations have to be performed every one second. In this case, the ratio of the negotiations to the transmission/reception of page text will increase, and the communication efficiency from the standpoint of communication cost, etc. decreases.

It appears that this problem will be solved if the server can voluntarily and directly send updated information to the client, independently from the request by the client. In view of the framework of the current WWW, however, this ideal is not practical. The reason is as follows.

In the current WWW, there is a case where a plurality of relay servers intervene between the server and client. Some relay servers are provided with mechanisms called "firewall" for transferring information only in one direction. The firewall is generally used, in particular, in companies, in order to prevent outside intruder from entering the systems within the companies (e.g. Intranet).

Where such relay servers intervene, the object with which the client directly communicates is the relay server closest to the client, and the object with which the server directly communicates is the relay server closest to the server. Accordingly, the direct client of the server is this relay server, and the server cannot specify the client used by the user on the network.

As a result, the server cannot directly send an update notification to the browser. Moreover, since the intervening relay server receives accesses from many non-specified clients or servers, there is a problem with reliability or stability. It is not ensured that the update notification from the server is quickly sent to the client with safety and exactness.

BRIEF SUMMARY OF THE INVENTION

The present invention has been made in consideration of the above circumstances, and an object of the invention is to provide a real-time information transmission system for realizing real-time information transmission from a server to a client in an existing WWW framework, thereby coping with information update in the server.

Another object of the invention is to provide a real-time information transmission system, wherein even if the time interval of information update on the server side is very short or information update occurs at a non-specified time, information update on the server side can be efficiently reflected on the client side, and the reliability and stability of communication between the server and client can be enhanced.

Still another object of the invention is to provide a real-time information transmission system for realizing such an exclusive control that the same page cannot simultaneously displayed on a plurality of clients excluding one client.

The present invention provides a real-time information transmission system for transmitting information in real time from a server to a client via a network, the system comprising: determination means for determining, on the basis of an information transmission request from the client to the server, whether the request is a page request or an event request; page transmission means for transmitting, if the determination means has determined that the request is the page request, information of the requested page only once from the server to the client at an originating point of the page request; event generating means for generating events; and event transmission means for transmitting, when the determination means has determined that the request is the event request, those of the events generated by the event generating means which are associated with the event request, from the server to the client at an originating point of the information transmission request in response to the event request issued once.

In this structure, a novel concept of "event request" for requesting updated information of currently opened page information is introduced in addition to a conventionally known concept of "page request". In the state in which the server and the client are being connected, the server continuously transmits event notifications to the client in response to a single event request in accordance with the occurrence of events. Thereby, each time page information has been updated on the server side, the updated content can automatically be reflected on the client side. Moreover, the load of communication between the server and the client can be reduced. In particular, where the interval of occurrence of events is one second or less, the efficiency is high and high real-time performance can be expected. Furthermore, since the server continuously sends event notifications in response to the request (event request) from the client, this invention is realized by using only the existing WWW protocols.

On the other hand, in the conventional push technique on the WWW, for example, a time of update of page information provided by the server is described in the page information and thereby the client (browser) accesses the server at that time. In this technique, problems arise with respect to data, such as time-sequential data, which is updated at a short interval of about one second, since the connection/disconnection of the network occurs frequently.

The present invention is also characterized in that at least one event request information unit for enabling the client, which has received page information sent from the server in response to a page request from the client, to issue the event request, that is, for activating an event notification on the server side, is set in the page information.

In this structure, the client, which received the requested page information from the server, can automatically issue the event request to the server according to the event request information set in the page information, and can activate the event notification. Specifically, by associating the page information with the event, the page information opened on the client side can be dynamically changed according to the event notification sent from the server.

In order for the server to determine whether the client has normally received an event notification, it is necessary to actually send the event notification. However, the server can perform nothing until an event occurs in the server. Thus, even if the page processing is finished in the client, the load for network connection is applied to the server.

According to this invention, in the situation in which each time an event has occurred in the server the event notification has to be sent to the client at the event request originating point, if no event has occurred for a predetermined time period, a special event notification (client state confirmation event notification) for confirming the state of the client at the event request originating point is sent from the server to the client. When the event notification (including the client state confirmation event notification) is sent from the server, the server determines whether the event notification is successful. If the event notification has failed, the network connection for the event notification is cut off on the server side.

In this structure, when no event has occurred for a predetermined time period or more, the special event notification for confirming the state of the client at the event request originating point is generated explicitly and periodically and sent to the client. Thereby, the state of the client can be understood. If the transmission of the event notification fails due to the termination of the page processing in the client or the disconnection of the network, the server cuts off the network connection and the useless load can be reduced.

In an example of application of the client-side processing for the event notification, if the client has received the event notification, the content of the notification may immediately be reflected on the screen. For this purpose, some device is needed when the page information opened on the client side is to be changed.

In the present invention, a predetermined procedure to be executed by the client is set in the page information including the event request information, which is sent from the server in response to the page request from the client. When the client which received the page information changes the display of the page information to display of page information corresponding to another page request, that is, when the client changes to another page, the client cuts off, according to the aforementioned procedure, the network connection associated with the event notification from the server in response to the event request.

In this structure, if the client has changed to another page, the client cuts off the network connection for receiving the event notification for reflecting the update of the previous page. Thus, useless communication can be eliminated. Moreover, the client does not require a special system for this processing.

In this invention, information indicating whether occurrence of an associated event is periodic or non-periodic, information on a time interval if the occurrence of the event is periodic and a predetermined procedure to be executed by the client are set in page information with information on the event request, which page information is transmitted from the server in accordance with the page request from the client. Thereby, when the occurrence of the associated event is periodic and the time interval thereof is greater than a predetermined time, the client which has received the page information temporarily cuts off network connection each time the client receives an event notification from the server in response to the event request, according to the predetermined procedure. The client also executes an operation to issue the event request once again after an event generation scheduled time set by the time interval has arrived.

In this structure, where the occurrence of events is periodic and the interval of occurrence is long, the client temporarily cuts off the network connection. If the set time of occurrence of events has drawn near, the network connection is made again and the event request is issued. Thus, the useless load of network and the load of the CPUs in the server and client can be reduced. Moreover, the client side does not require a special system for this processing.

In the present invention, a predetermined procedure to be executed by the client is set in page information with the event request information, which page information is sent from the server in response to the page request from the client, or in an event notification transmitted from the server in response to the event request from the client, and time information on occurrence of the same event occurs is set in the event notification. Thereby, the client, which has received the event notification, is caused to monitor the arrival of the next event notification according to the predetermined procedure, and to issue the event request to the server where the client could not receive the next event notification from the server at a set time indicated in the time information in the received event notification.

In this structure, where the time of occurrence of the event can be estimated, if the event has not been sent from the server at that time, it is assumed that the network has temporarily been cut off. Then, the event request is issued once again from the client, and the network connection can be resumed. Thus, the reliability is enhanced. Specifically, the connection for the event notification is maintained, but if the connection is cut off due to some external cause, the client automatically re-connects the network. Accordingly, even in the case of an unstable network, the reliability can be expected to some degree. In addition, the client side does not require a special system for this processing.

In the present invention, a procedure for adding time information for issuing a next event request to the event request issued by the client is set in page information with the event request information, which page information is sent from the server in response to the page request from the client. Thereby, when the event request with the time information has been issued from the client, which received the page information, to the server, the server monitors arrival of the next event request from the client, and cuts off network connection relating to the event request, if the server could not receive the next event request at a set time indicated in the time information in the preceding event request.

In this structure, the server can recognize in advance the fixed time of the occurrence of the event request from the client. If the event request has not been issued at that time, the server determines that the client does not normally function (the operation is terminated or the network is disconnected). Thus, the server cuts off the network connection and the useless load on the CPU in the server can be reduced. Moreover, the client does not require a special system for notifying the server of the preset time of occurrence of the next event request.

In the present invention, information on an exclusive page, which is prohibited from being displayed simultaneously on a plurality of clients, is registered in the server. Where the server has received the page request from the client, the server determines whether the requested page is an exclusive page, on the basis of the registered information of the exclusive page. If the request page is the exclusive page, the server determines whether the page is being displayed on another client. If the page is not being displayed on the another client, new page information, in which the event request information is set in the requested page information, is sent to the client at the originating point of the page request. If the page is being displayed on the another client, specific page information, in which specific event request information for issuing a specific event request is set, is sent to the client at the originating point of the page request, instead of the requested page information, and the client is caused to wait for display of the requested page information. Where network connection relating to an event notification from the server to the client which is in the state of displaying the exclusive page is cut off and there are clients which are in the state of waiting for display of the exclusive page, new page information, in which the event request information is set in the requested page information, is sent to one of the clients waiting for the display of the exclusive page as a response to the specific event request.

In this structure, the event request issuance from the client according to the event request information incorporated in the page information is utilized to easily realize a mechanism (page lock mechanism) which prevents simultaneous display of the same page on a plurality of clients. This mechanism has been difficult to achieve in the conventional WWW. Moreover, where the page processing in the client displaying the exclusive page is finished, another client which could not display the page is informed to that effect. Thus, this client can automatically change the display to the actually requested page. Therefore, the user interface is enhanced.

In the present invention, where the page request or the event request has been sent to the server from the client which is in the waiting state since the requested page is the exclusive page and is displayed on another client, processing of the request in the server is changed from normal state.

If the request is issued from the client, which is in the wait state for the locked page, to the server, the processing for the request is changed from a normal one. For example, by ignoring the request, the client itself can be virtually locked. When a control device is controlled from the client side, a control is prevented from being transferred to another client, and the reliability is enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 shows an example of the format of an HTML file applied to this embodiment;

FIG. 8 shows an example of the format of a page on which the screen image in FIG. 7 is based;

DETAILED DESCRIPTION OF THE INVENTION

[First Embodiment]

Figure 1:
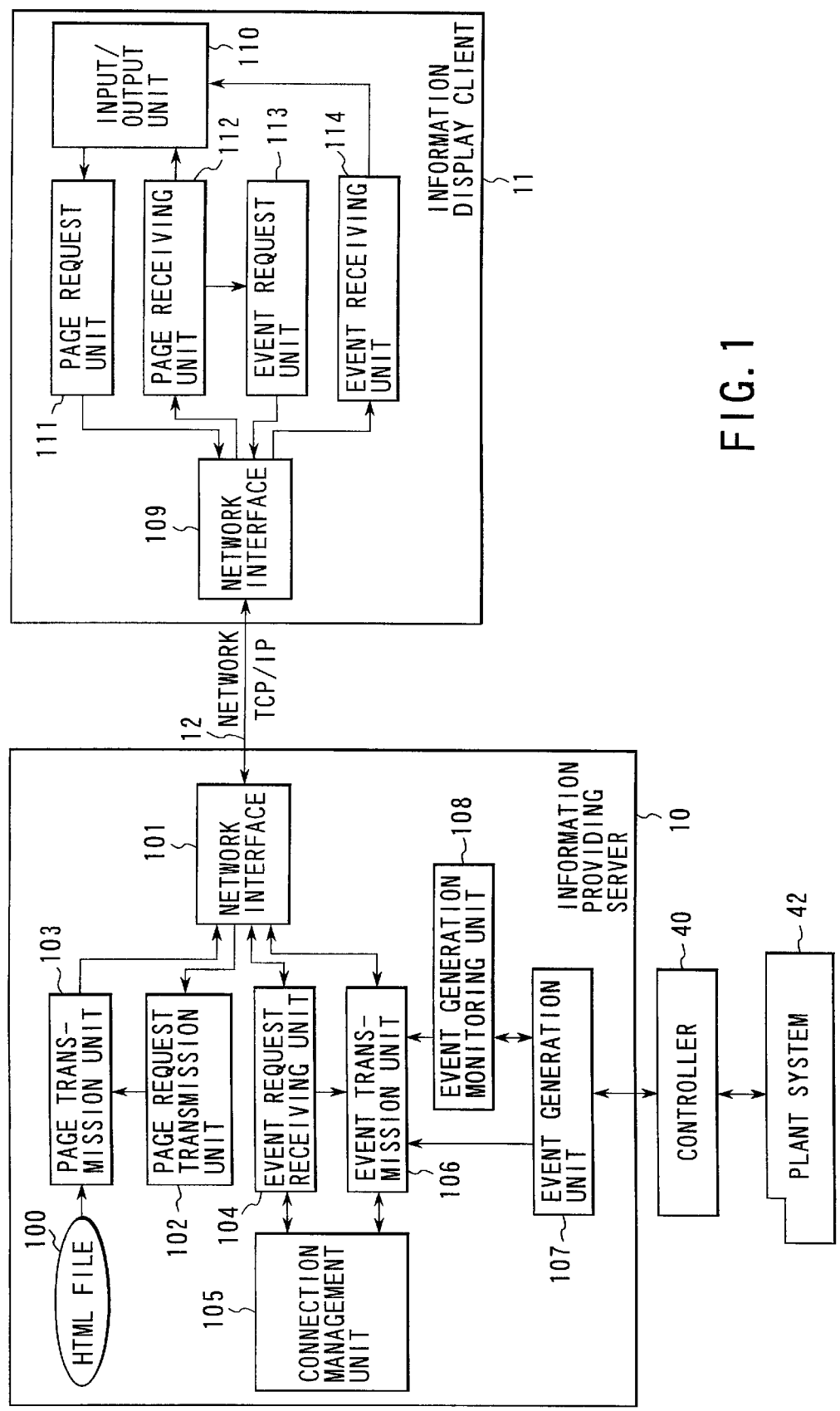
FIG. 1 is a block diagram showing the structure of a real-time information transmission system according to a first embodiment of the present invention.

FIG. 1 is a block diagram showing the structure of a real-time information transmission system according to a first embodiment of the present invention.

In FIG. 1, an information providing server 10 functions as a WWW (World Wide Web) server and is connected to a network 12 such as the Internet. An information display client 11 has a browser for issuing a request to the information providing server 10 and displaying a result. The browser may be a general-purpose one such as the Netscape Navigator (Netscape Communications Corporation) or the Internet Explorer (Microsoft Corporation).

Though not shown, a relay server called "proxy server" may be provided between the information providing server 10 and information display client 11. The proxy server receives a request from the client, sends the request to the server as it is, and returns a result from the server directly to the client. A plurality of such proxy servers may be provided between the information providing server 10 and information display client 11. In the following description, unless there is ambiguity, the information providing server is referred to simply as "server", and the information display client as "client". In addition, the client may be called "browser" in some cases.

For the purpose of convenience, FIG. 1 shows only one client 11 connected to the network 12, but in general a plurality of clients 11 are connected to the network 12. Needless to say, the number of servers 10 is not limited to one.

FIG. 1 shows a case where a plant system 42 is connected to the server 10 via a controller 40. The plant system 42 and its controller 40 may be connected not to the server 10 but to the network 12. The server 10 monitors the operation of the plant system 42 through the controller 40, and provides various useful information to the client 11.

The plant system 42 is merely an example of the application of this invention, and the invention is applicable to OA equipment, mobile phones, TV sets, etc.

The structure of the server 10 will now be described.

A network interface 101 functions to receive data from the network 12 and to transmit data to the network 12. The network interface 101 also functions to discriminate the type of received data and to deliver the data to a unit in the server 10, which is associated with the discriminated type.

A page request receiving unit 102 receives a page request sent from the client 11 via the network interface 101, analyzes it, and informs a page transmission unit 103 of a page to be sent to the client 11. Suppose that a format called URL (Uniform Resource Locator), which is generally used in the WWW, is applied to the page request.

The page transmission unit 103 transmits an HTML file 100 stored in the server 10 to the network 12 via the network interface 101. Information to be transmitted is not limited to the HTML file (100), and may be freely chosen one such as image or voice.

An event request receiving unit 104 receives an event request sent from the client 11 via the network interface 101, analyzes it, and communicates with a connection management unit 105 to determine whether the event request should be processed. The event request receiving unit 104 instructs an event transmission unit 106, where necessary, to transmit an event to the client 11.

An event generating unit 107 generates events asynchronously or non-periodically. The kind of event to be generated is freely chosen. The examples are an event indicating the fact that a current flowing a specific control device in the plant system 42 has exceeded a predetermined value, an event indicating the fact that the number of clients 11 accessing the server 10 has reached a predetermined value, and an event indicating that a predesignated time has arrived.

An event generated by the event generating unit 107 is directly sent to the event transmission unit 106.

Alternatively, an event generation monitoring unit 108 may monitor a factor of generation of an event and, as a result, may generate an event of a different kind which is not generated by the event generating unit 107 and send it to the event transmission unit 106.

More specifically, an event indicating, for example, that a current flowing in a specific control device in the plant system 42 has decreased to or below a predetermined value (e.g. 100 A or less), is not defined in the event generating unit 107, the event generation monitoring unit 108 periodically monitors the current in the control device and, if the current has decreased to or below a predetermined value (100 A or less), it generates a corresponding event.

The event generation monitoring unit 108 also generates other various events, for example, an event for notifying the client 11 of the fact that the number of times of generation of a specific event in the event generating unit 107 has reached a predetermined value.

In the present embodiment, as described above, the events to be input to the event transmission unit 106 are generated from two systems: the event generating unit 107 and event generation monitoring unit 108. However, only one of them may be provided.

The event transmission unit 106 transmits the event, which has been sent from the event generating unit 107 or event generation monitoring unit 108, to the client 11 via the network interface 101. In a case where the same event is requested by a plurality of clients 11, the event transmission unit 106 sends the same event to the respective clients 11.

The connection management unit 105 manages, for example, on a table format, information indicating which event is requested by which client, namely, connection information.

If a certain event has occurred, the event transmission unit 106 refers to the information managed by the connection management unit 105, and sends the event to all clients 11 requesting it. It should be noted that unlike the page sent by the page transmission unit 103, the event is a transient one and the same event has to be copied by a number corresponding to the number of clients 11, irrespective of the number of clients 11 requesting the event, and the copied events have to be sent.

The structure of the client 11 will now be described.

A network interface 109 sends a page request or an event request from the client 11 to the sever 10 which is to be sent to the server 10 connected to the network 12, and receives a response from the server 10. The network interface 109 forwards the response from the server 10 to a page receiving unit 112 or an event receiving unit 114 according to the kind of the response.

An input/output unit 110 comprises a keyboard, a display and a mouse. The URL of the page request is sent to a page request unit 111 by an operation using the input/output unit 110, for example, by directly inputting the URL to, e.g. the keyboard of the input/output unit 110, or by clicking a link on the page by means of the mouse.

If the address (URL) of the page is input to the page request unit 111 from the input/output unit 110, the input/output unit 110 requests the server 10 via the network interface 109 to transmit the page specified by the URL.

The page receiving unit 112 receives a response from the server 10 to the page request, that is, the requested page, via the network interface 109. The received page is displayed on the display of the input/output unit 110. There is a case where the page received from the server 10 includes a description for issuing an event request to the server 10. In such a case, the page receiving unit 112 informs an event request unit 113 of the URL of the event request.

The event request unit 113 sends the URL of the event request to the server 10 via the network interface 109. Though not shown, the URL of the event request may not only be delivered from the page receiving unit 112, but also it may be directly input to the input/output unit 10 by the user.

The event receiving unit 114 receives the event sent from the server 10 on the basis of the request to the server 10 from the event request unit 113. The received event is sent to the input/output unit 110, where necessary. For example, if the received event is an event indicating the update of the page in the server 10, the client 11 issues a page request to the server 10 and enables the updated page to be displayed on the display screen once again (i.e. the updated content being reflected on the display).

In the present embodiment, the format of the page sent from the server 10 in response to the page request from the client 11 is a normal HTML file format. Of course, another format may be adopted.

FIG. 2 shows an example of the HTML file format. In this example, an event request to the server is included in the page. The event request is expressed by an attribute "URL" in a tag "EVENT" in a tag "EMBED". The format of expression of the event request is not limited to this. It may be assumed, for example, that the event request is not positively described in the HTML file but is expressed as a link to another page, and the event request is described in the page of the destination link and is sent to the server 10 from the HTML file at the originating point.

It is also possible to adopt a method wherein the event request is generated dynamically from a certain program incorporated in the page (e.g. "Applet" of Java developed by Sun Microsystems, or "JavaScript" developed by Netscape).

Referring to the flow chart of FIG. 3, a description will now be given of the flow of processing in the client 11 of the system shown in FIG. 1, with respect to the page request to the server 10 from the client 11 and the accompanying page request.

In a case where a page request (URL) has been generated from the input/output unit 110 in the client 11 (step A1), if an event request is included in the currently displayed page, the network interface 109 cuts off network connection relating to the transmission of the requested event from the server 10 (step A2). This is realized by describing in advance in the currently displayed page the procedure wherein when another page request has been generated in the client 11, i.e. when the currently displayed page is to be changed, the network connection for receiving the event relating to the currently displayed page including the event request is cut off from the client (11) side. For this procedure, Java (Applet) of Sun Microsystems or JavaScript of Netscape Communications is applicable.

The page request unit 111 issues the page request to a proper server 10b (step A3). The page receiving unit 112 prepares to read a response from the server 10 (step A4) and waits until the page is sent from the server 10 (step A5). The page receiving unit 112 analyzes the content of the page sent from the server 10 (step A6) to determine whether an event request is included in the page (step A7).

If an event request is not included, the page receiving unit 112 outputs the page to the input/output unit 110 (step A12). Thus, the content of the received page is displayed on the display of the input/output unit 110.

On the other hand, if the event request is included, the page receiving unit 112 informs the event request unit 113 of the URL of the event and causes the event request unit 113 to send the event request to the server 10 (step A8). In this case, the page receiving unit 112 prepares to read a response (event) from the server 10 (step A9) to check whether the event has been sent from the server 10 (step A10). If the event is not sent, the page receiving unit 112 continues to wait. If the even has been sent, the page receiving unit 112 processes it (step A11). The display screen image of the input/output unit 110 is updated, depending on the result of processing of the event, as will be described later.

Figure 3:
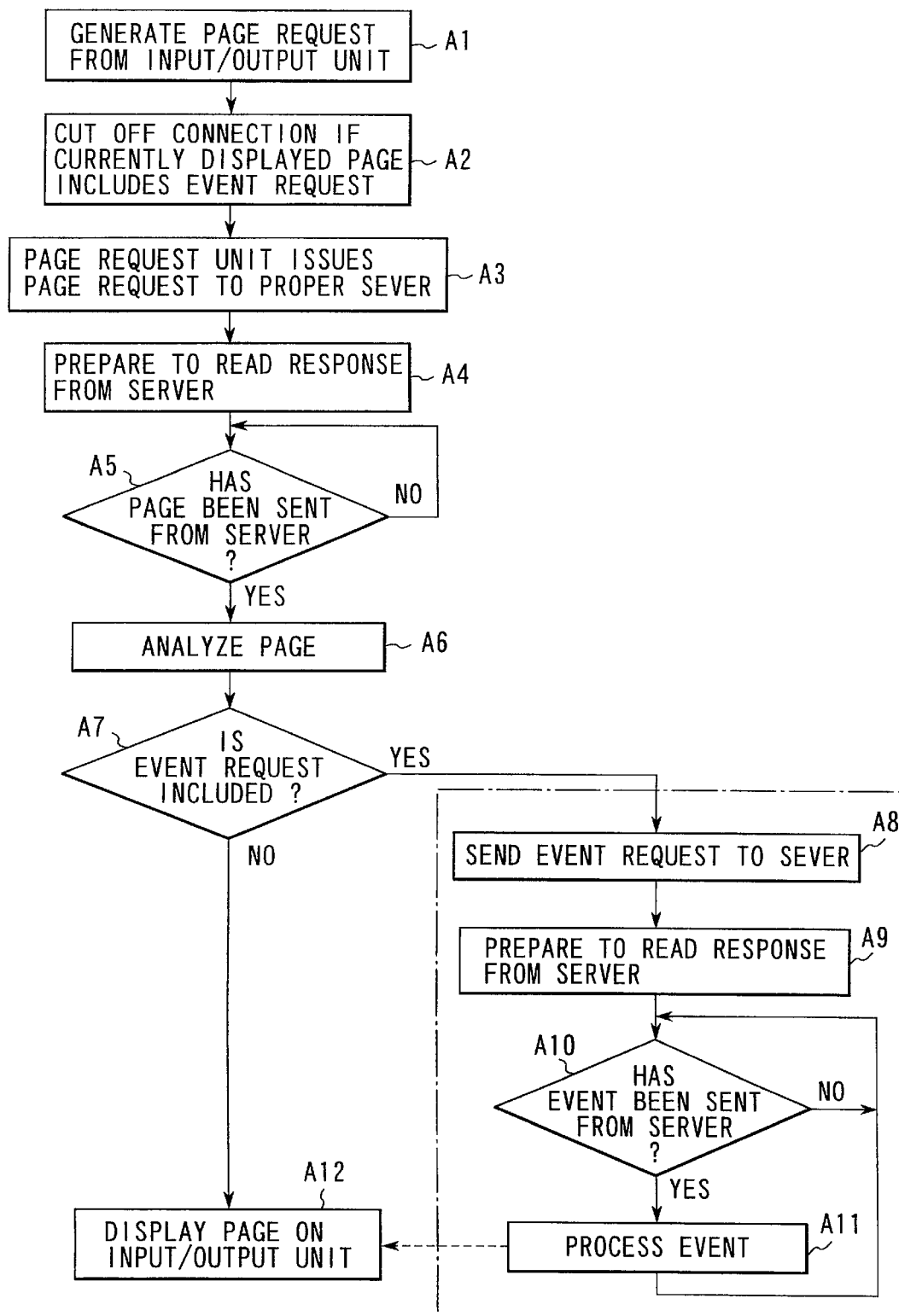
FIG. 3 is a flow chart for describing the flow of processing in a client 11 shown in FIG. 1.

The processing indicated by a dot-and-dash line in the flow chart of FIG. 3 (steps A8 to A11) may be carried out in parallel to step A12. In other words, even while the page is being displayed on the screen in step A12, the reading or processing of the event can be performed. Even where a plurality of event requests are described in one page, the events can be processed simultaneously.

The characteristic of the processing on the client (11) side is that the number of responses to the page request is one while the number of responses to the event request is infinite. Though not shown, an external instruction is needed to terminate the event processing.

Figure 4:
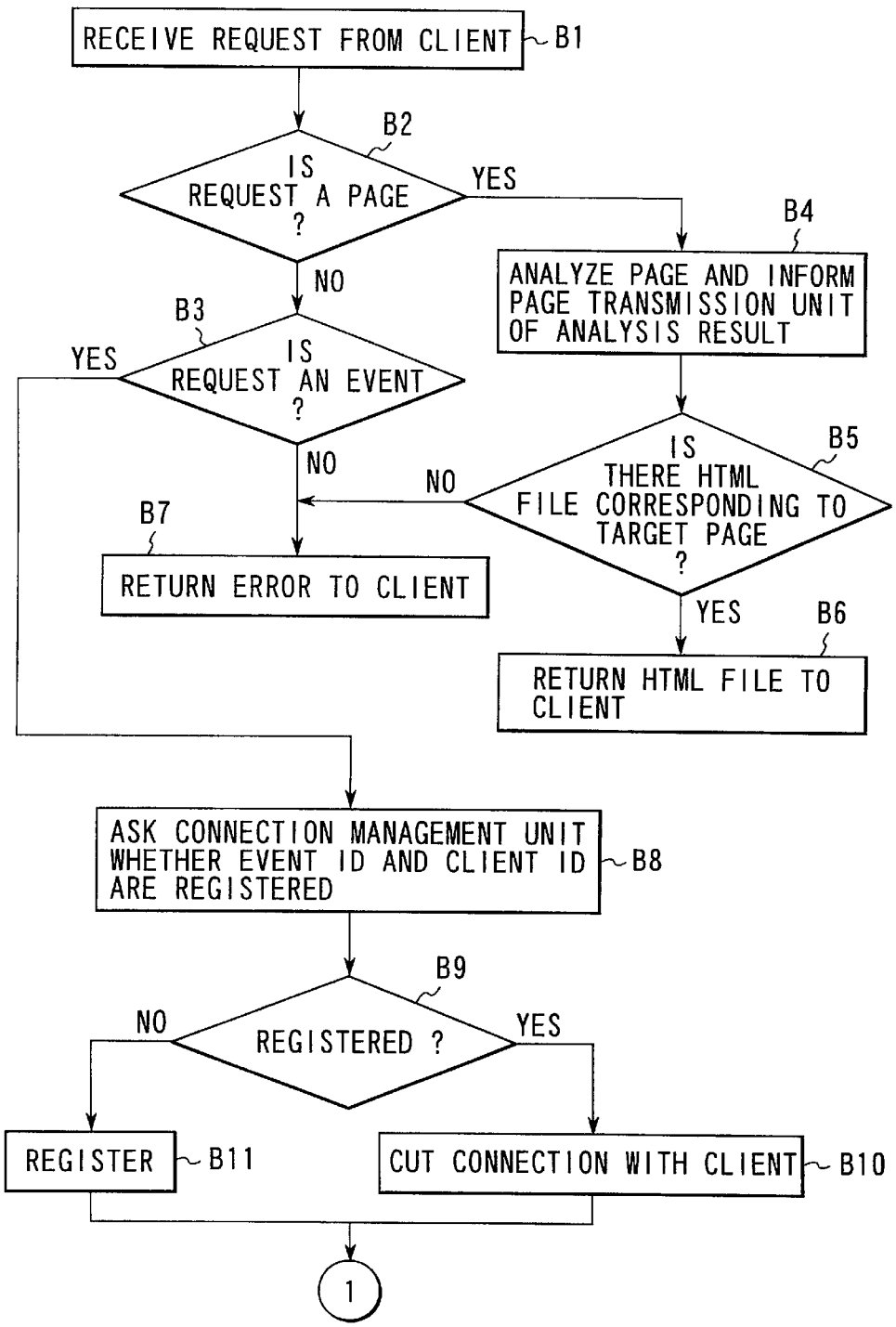
FIG. 4 shows a part of a flow chart for describing the flow of processing in a server 10 shown in FIG. 1.
Figure 5:
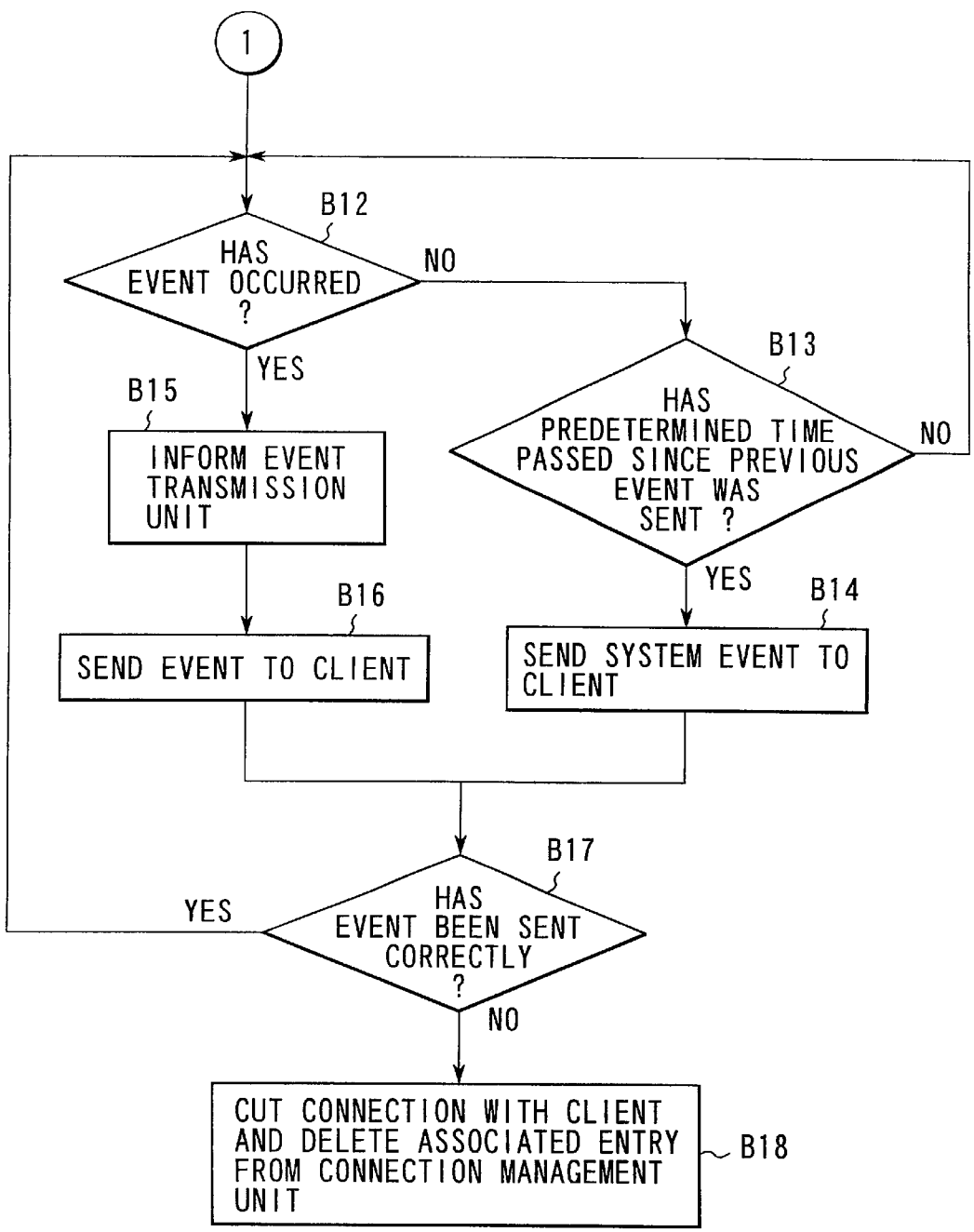
FIG. 5 shows the other part of the flow chart for describing the flow of processing in the server 10 shown in FIG. 1.

The flow of processing on the server (10) side will now be described with reference to the flow charts of FIGS. 4 and 5.

The network interface 101 in the server 10 always stands by to receive a request from the client 11 (step B1). If the interface 101 receives the request from the client 11, it determines whether the request is a page request or an event request (steps B2, B3).

If the request from the client 11 is the page request, the network interface 101 delivers it to the page request receiving unit 102. The page request receiving unit 102 analyzes the content of the page request and informs the page transmission unit 103 of the result of analysis (step B4). The page transmission unit 103 determines whether there is an HTML file 100 corresponding to the requested page (in a file storage unit not shown) (step B5). If there is the corresponding HTML file 100, the page transmission unit 103 sends the file 100 back to the client 11 at the request originating point (step B6). If not, the page transmission unit 103 sends an error message back to the client 11 (step B7). In this embodiment, it is assumed that the page file is the HTML file, but the file format is not limited to this.

On the other hand, if the request from the client 11 is the event request, the network interface 101 delivers it to the event request receiving unit 104. The event request receiving unit 104 asks the connection management unit 105 whether or not an identifier (event ID) of the event requested by the event request and an identifier (client ID) of the client 11 at the request originating point have already been registered (steps B8, B9). If they are registered, the connection with the client 11 is cut off (step B10). If they are not registered, a pair of the identifier (event ID) of the event requested by the event request and the identifier (client ID) of the client 11 at the request originating point are registered in the connection management unit 105 (step B11).

As will become clear from a description to be stated later, the fact that the event ID and the client ID are registered in the connection management unit 105 means that communication (connection) has already been established between the server 10 and the client 11 identified by the client ID. By cutting off the connection in step B10, double transmission of the event to the same client 11 is prevented.

Subsequently, it is determined whether an event has occurred in at least one of the event generation unit 107 and event generation monitoring unit 108 (step B12). If no event has occurred, it is determined whether a predetermined time period has passed since the latest event was transmitted from the event transmission unit 106 (step B13). If the predetermined time period has passed, the event transmission unit 106 transmits a special event called "system event" to the client 11 at the event request originating point, thereby to confirm the condition, etc. of this client 11 (step B14). On the other hand, if the time period has not yet passed, it is determined once again whether an event has occurred in the event generation unit 107 or event generation monitoring unit 108 (step B12).

If an event has occurred in the event generation unit 107 or event generation monitoring unit 108, the event transmission unit 106 is instructed to send the event to the client 11 (step B15). Thus, the event transmission unit 106 sends the generated event to the client 11 at the event request originating point via the network interface 101 (step B16).

After the event was sent to the client 11, it is determined whether the event has correctly been sent on the basis of a response from the client 11 (step B17). If the event has correctly been sent, the next occurrence of event is awaited. If the event has not correctly been sent, the connection with the client 11 is cut off and the associated item is deleted from the connection management unit 105 (step B18).

In the above characteristic operation of the server 10, if an event request is once received from the client 11, events relating to the event request continue to be sent to the client 11 each time they have occurred. This operation differs from the operation in the case of the page request, in which one page is sent in response to one page request.

In order to transmit every occurring event in response to one event request, the connection between the server 10 and client 11 at the event request originating point is always maintained. If the event is not correctly sent, the connection is cut off.

In order to recognize, from the server (10) side, whether the client 11 has normally received an event notification, it is necessary that the event notification be actually sent. However, since the server can perform nothing until the event occurs in the server 10, a load for network connection is put on the server 10 even if the page processing is finished in the client 11.

In the situation in which each time an event has occurred in the server 10 the event notification has to be sent to the client at the event request originating point, if no event has occurred for a predetermined time period, a special event notification (system event notification) for confirming the state of the client 11 at the event request originating point is sent from the server 10 to the client 11. The server 10 determines whether the event notification is successful. If the event notification has failed, the network connection for the event notification is cut off on the server (10) side.

If the event notification has failed because the page processing in the client 11 is finished or the connection of the network 12 is cut off, the server 10 cuts off the network connection and thus a useless communication load is reduced.

The mutual operations of the server 10 and client 11 in the system in FIG. 1 will now be described.

Figure 6:
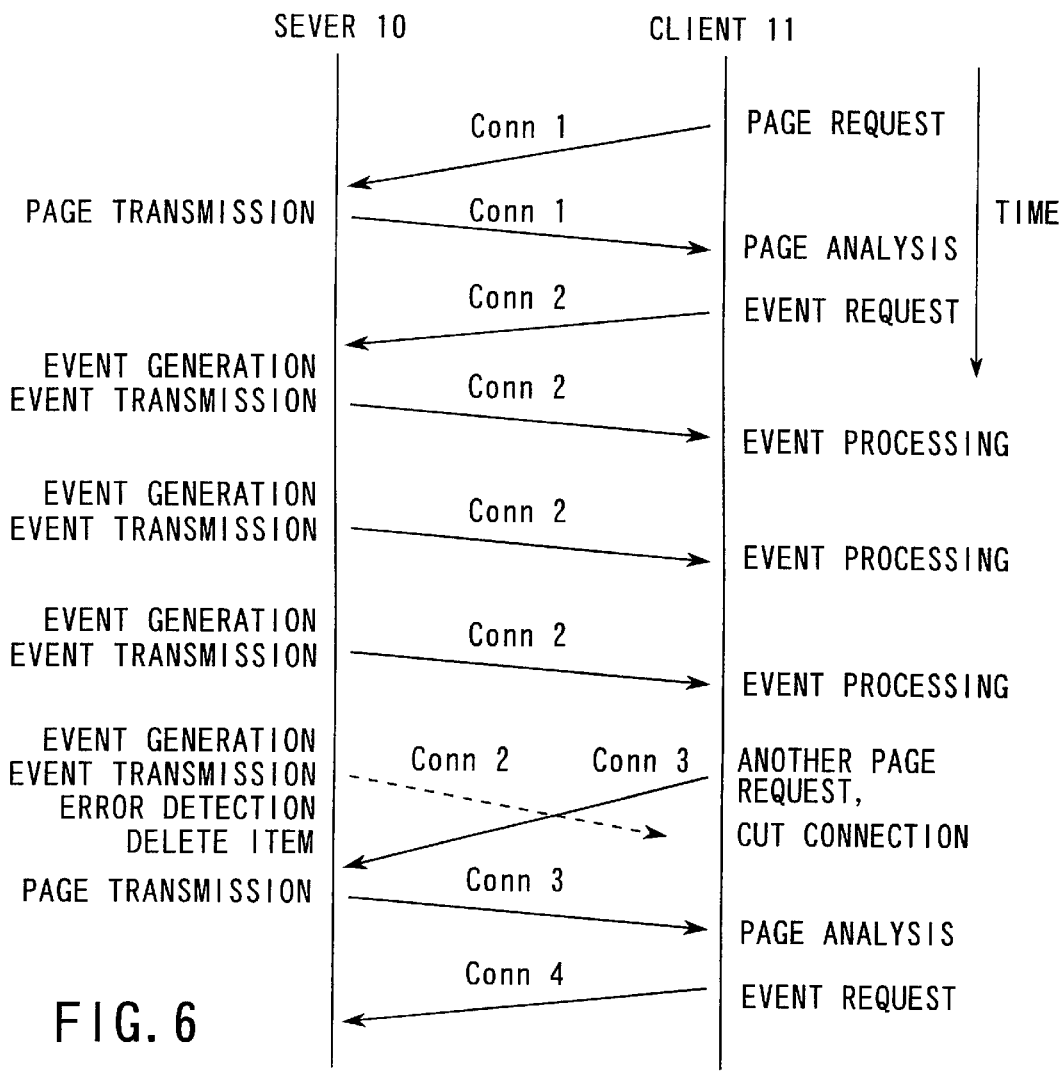
FIG. 6 shows an example of a process of communication between the server 10 and client 11 in FIG. 1 in relation to a time axis.

FIG. 6 shows an example of the communication process between the server 10 and client 11 in relation to the time axis.

If a page request is sent from the client 11 to the server 10, the server 10 returns the requested page to the client 11. The same ID (Conn1 in FIG. 6) is added to the request from the client 11 and the response by the server 10 in order to establish their correspondency.

The client 11 analyzes the sent page, searches for an event request described therein, and sends it to the server 10. In this case, another connection ID (Conn2) is used. If an event has occurred, the server 10 sends it to the client 11 with use of this connection ID. Subsequently, as shown in FIG. 6, each time an event has occurred, it is sent repeatedly with use of the ID (Conn2).

When the client 11 sends another page request (Conn3), it simultaneously cuts off the connection of the request Conn2. Then, if the event to be sent with ID Conn2 has occurred in the server 10, an error is detected and the associated item is deleted from the connection management unit 105. In response to a new page request from the client 11, the server 10 sends the associated page to the client 11. Similar communication operations will be repeated.

The following advantage is obtained by cutting off the connection for event transmission from the server 10 when the client 11 has issued another page request. In practical cases, when the client 11 has received an event from the server 10, a visual effect is provided on the screen image of the page associated with the requested event in the event processing on the client (11) side. If the display is switched to another page and the page itself associated with the event request disappears from the screen, this means that the received event has become useless. In other words, useless event processing is prevented. Needless to say, however, the event processing may be continued by system configuration even after the page associated with the event request has been switched to another page by an explicit instruction.

A description will now be given of a method of processing the event sent from the server 10 on the client (11) side and updating the screen image of the browser (page display screen image).

Figure 7:
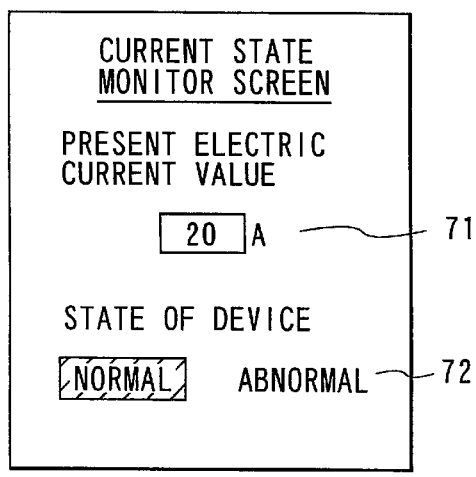
FIG. 7 shows an example of a screen image of a browser.

FIG. 7 shows an example of the screen image of the browser. This example relates to a page for monitoring the state of current in a specific control device in the plant system 42. A page comprising a current value display section 71 indicating a value of electric current at present and a state display section 72 indicating the state of a device (control device) is displayed by the browser.

An event request is described on this page. If the page is displayed by the browser, the event request described on the page is sent to the server 10 which provides this page. In this example, the event requested on this page includes an event indicating a present value of an electric current, which is sent from the server 10 at intervals of one second, and an event indicating the state (normal/abnormal) of the device, which is sent from the server 10 asynchronously.

The current value in the specific device in the plant system 42 is monitored by the server 10 every second through the controller 40. Specifically, the event generating unit 107 or event generation monitoring unit 108 generates the event of the present value of electric current at intervals of one second. In addition, the state (normal/abnormal) of the control device is monitored by the server 10 through the controller 40. The event generating unit 107 or event generation monitoring unit 108 generates events of the state (normal/abnormal) of the control device non-periodically.

These generated events are transmitted in real time to the client 11.

The browser (client 11) processes a plurality of events (both the event indicating the present value of current and the event indicating the state of the device being transmitted in real time) sent from the server 10 in response to one event request issued in accordance with the displayed page, and reflects on the screen the event processing results on the current value display section 71 or device state display section 72.

The event processing results can be reflected on the page screen image (event screen image) by using the Java(Applet) of Sun Microsystems, JavaScript of Netscape Communications, or Dynamic HTML of Microsoft. Needless to say, the method is not limited to these.

FIG. 8 shows an HTML expression of a page, on which the screen display in FIG. 7 is based. In the example of FIG. 8, the event request to the server 10 is designated by a tag "EVENT" on the page. This tag includes attributes such as a time interval ("period") of events to be sent to the client 11 and a target ("target") for reflecting the received event on the screen. A tag "HANDLER" is introduced as a tag for reflecting the event on the screen. This tag includes attributes such as a format ("type") for screen display and a name ("name"). The same name as the name attribute is designated in the target attribute in the tag "EVENT". This example of expression is merely an example, and other formats may be used.

According to the browser screen in FIG. 7 of the electric current state monitoring page in the client 11, the user can monitor the present electric current value of the specific control device of the plant system at intervals of one second, without performing a display update operation, for example, by depressing a reload button. In addition, the user can monitor the change in state (normal/abnormal) of the control device. As has been described above, since the server continuously returns responses (generated events) to a single event request from the client 11 while the connection is being maintained, the information transmission can be efficiently carried out without increasing a communication load between the client 11 and server 10.

[Second Embodiment]

Figure 9:
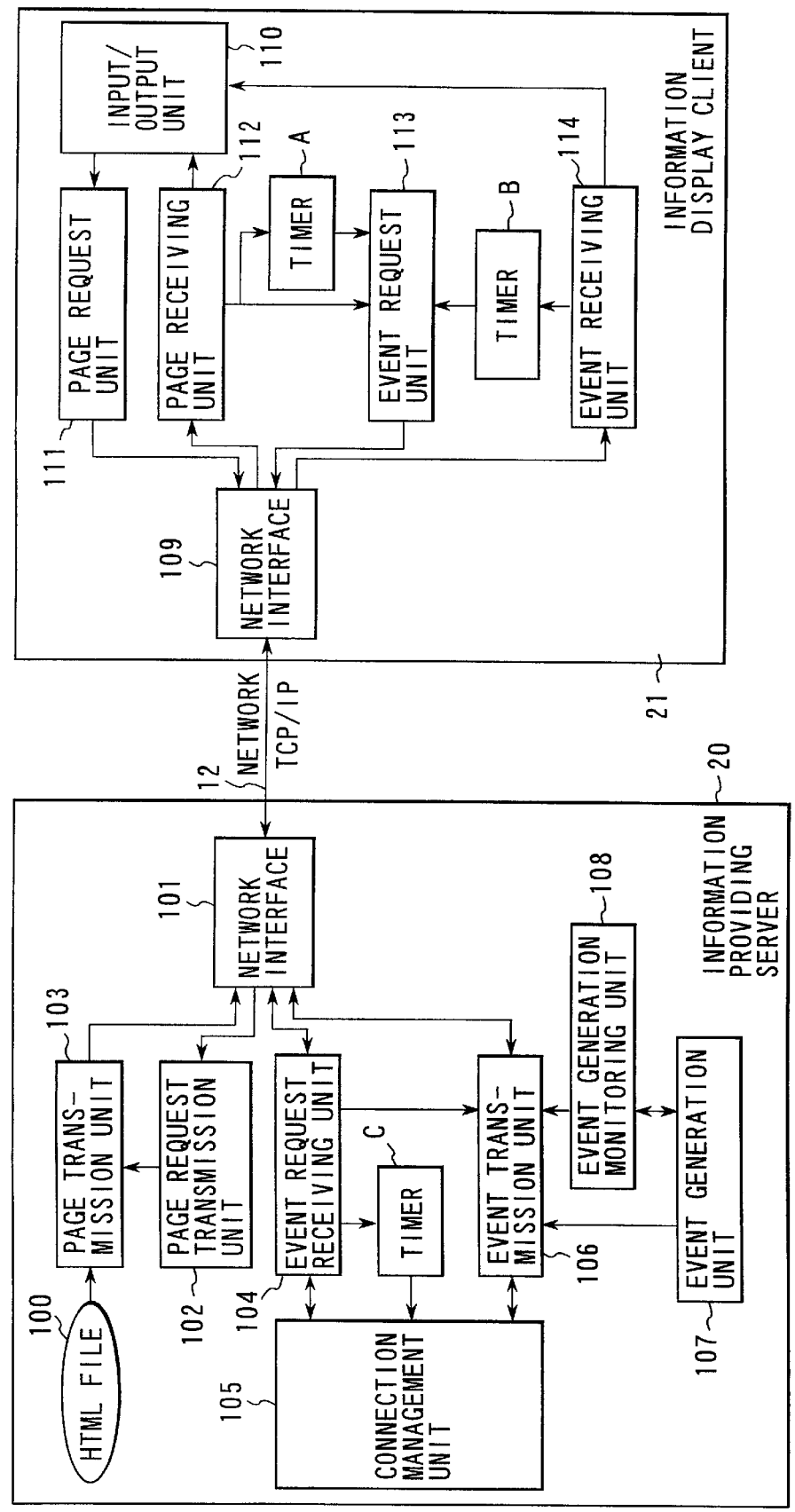
FIG. 9 is a block diagram showing the structure of a real-time information transmission system according to a second embodiment of the present invention.

FIG. 9 is a block diagram showing the structure of a real-time information transmission system according to a second embodiment of the invention. In FIG. 9, the structural parts common to those in FIG. 1 are denoted by like reference numerals.

The system in FIG. 9 differs from that in FIG. 1 in that the server 10 in FIG. 1 is replaced with a server (information providing server) 20 to which a timer unit C is added, and the client 11 in FIG. 1 is replaced with a client (information display client) 21 to which a timer unit A and a timer unit B are added.

The system in FIG. 9 is characterized by the provision of the timer units A to C. Thereby, as will be described later, the event transmission method is flexibly changed in accordance with the interval of occurrence of events in the server 20, and an event request from the client 21 to the server 20 is automatically issued once again when the network 12 is cut off due to some fault.

Figure 10:
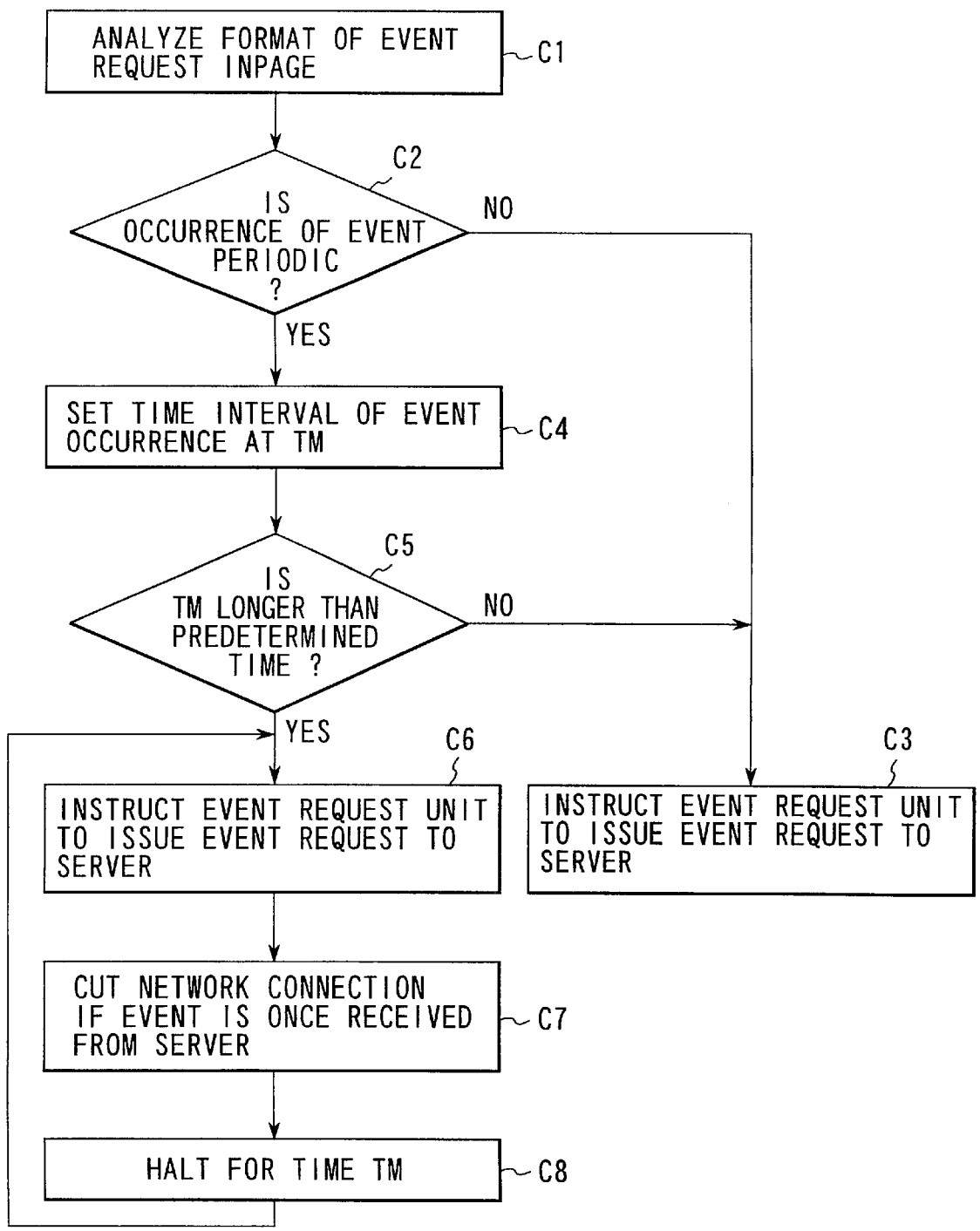
FIG. 10 is a flow chart for describing the operation of, in particular, a timer unit A of the client 21 in the system shown in FIG. 9.

The operation of, in particular, the timer unit A in the client 21 in the system of FIG. 9 will now be described with reference to the flow chart of FIG. 10.

If a page requested by the client 21 is sent from the server 20 to the client 21, the timer unit A receives the page via the page receiving unit 112 and analyzes the format of the event request in the page (step C1). The timer unit A then determines whether the occurrence of events is periodic on the basis of the analysis result in step C1 (step C2). If the occurrence of events is periodic, the time interval of occurrence of events is described on the page.

If the occurrence of events is non-periodic, the timer unit A does not perform a special operation characterizing the present embodiment and directly instructs the event request unit 113 to issue the event request to the server 20 (step C3). On the other hand, if the occurrence of events is periodic, the timer unit A sets the event occurrence time interval (obtained from the page analysis result received from the page receiving unit 112) at TM (step C4) and determines whether the TM is longer than a predetermined time (step C5).

If the TM is shorter, the timer unit A does not perform a special operation characterizing this embodiment and directly instructs the event request unit 113 to issue the event request to the server 20 (step C3). On the other hand, if the TM is longer, the timer unit A sets the time TM in the timer unit A and starts the measurement of time, and instructs the event request unit 113 to issue the event request to the server 20 (step C6). Thus, the event request is issued from the event request unit 113 to the server 20. In this case, if the time of the issuance of the next event request is specified, for example, in a case where the event requests are issued periodically, the event request unit 113 issues an event request to which the information on the time of the issuance of the next event request is added.

If the requested event is sent from the server 20 in response to the event request from the event request unit 113, the event receiving unit 114 processes the event and the network interface 109 cuts off the connection of the network 12 relating to this event (step C7). The event (event notification) sent from the server 20 is provided with information on the occurrence time of a same-kind event if the time of the next occurrence of the same-kind event is understood, for example, in a case where the events are generated periodically.

On the other hand, if the event is sent from the server 20, the timer unit A halts until the measurement of the time TM is completed, that is, from the-time of start of step C6 to the end of time TM (step C8). If the time TM is measured, that is, if the time of occurrence of the next event arrives, the timer unit A returns to step C6 and repeats the same processing.

The functions of the timer A are as follows. Where the time interval of occurrence of events in the server 20 is periodic, and where the time interval TM is longer than the predetermined time, the timer unit A measures the time TM up to the reception of the event and, during this time period, cuts off the network connection for receiving the event. If the time TM has been measured, the event request is explicitly issued from the client 21 (i.e. the event request unit 113 in the client 21) to the server 21. Thereby, a useless load on the server (20) side is reduced while the event does not occur. On the client (21) side, too, a useless load is reduced when the client 21 waits for the reception of the event in a time period in which no event is to be sent from the server 20.

In this example, the time interval of occurrence of events is used. Alternatively, an absolute time of occurrence of events, for example, may be used.

Figure 11:
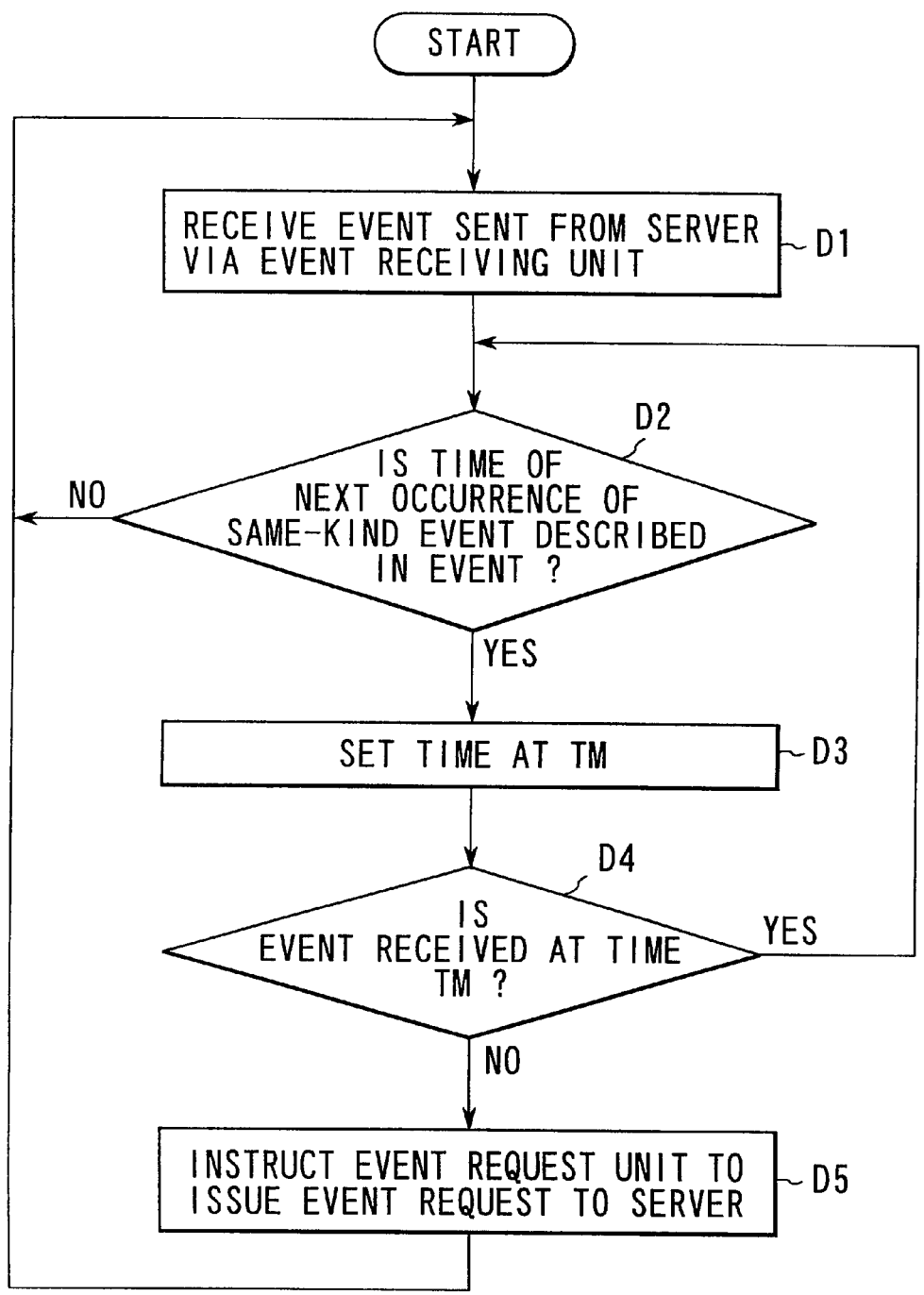
FIG. 11 is a flow chart for describing the operation of, in particular, a timer unit B of the client 21 in the system shown in FIG. 9.

The operation of, in particular, the timer unit B in the client 21 in the system of FIG. 9 will now be described with reference to the flow chart of FIG. 11.

The timer unit B receives via the event receiving unit 114 the event sent from the server 20 (step D1). The timer unit B determines whether the time of the next occurrence of a same-kind event is described in the event (step D2). If it is not described, the control returns to step D1. If it is described, the time of the next occurrence of the same-kind event is set at TM (step D3) and it is checked whether the next event has been actually received at that time (step D4). If the event has been received at time TM, the control returns to step D2. On the other hand, if the event has not been received at time TM, the event request unit 113 is instructed to issue the event request to the server 20 and the control returns to step D1.

The functions of the timer unit B are as follows. If information on the time of the next occurrence of the same-kind event is added to the event sent from the server 20, for example, in a case where the time interval of events generated in the server 20 is periodic, the timer unit B monitors whether the event has been sent from the server 20 to the client 21 in response to the event request from the client 21 at the time represented by the information. If the event is not sent from the server 20 at the time at which it should normally be sent, the client 21 issues the event request to the server 20 once again. Thereby, even if the network 12 is temporarily cut off due to some cause, the reception of the event can be resumed In the above-described timer units A and B in the client 21, for example, an associated processing procedure may be preset in a page in which the event request is set and this page may be sent from the server 20 to the client 21. Alternatively, this processing procedure may be set in the event sent from the server 20 to the client 21 in response to the event request. For this processing procedure, the Java (Applet) of Sun Microsystems or JavaScript of Netscape Communications may be applied.

Figure 12:
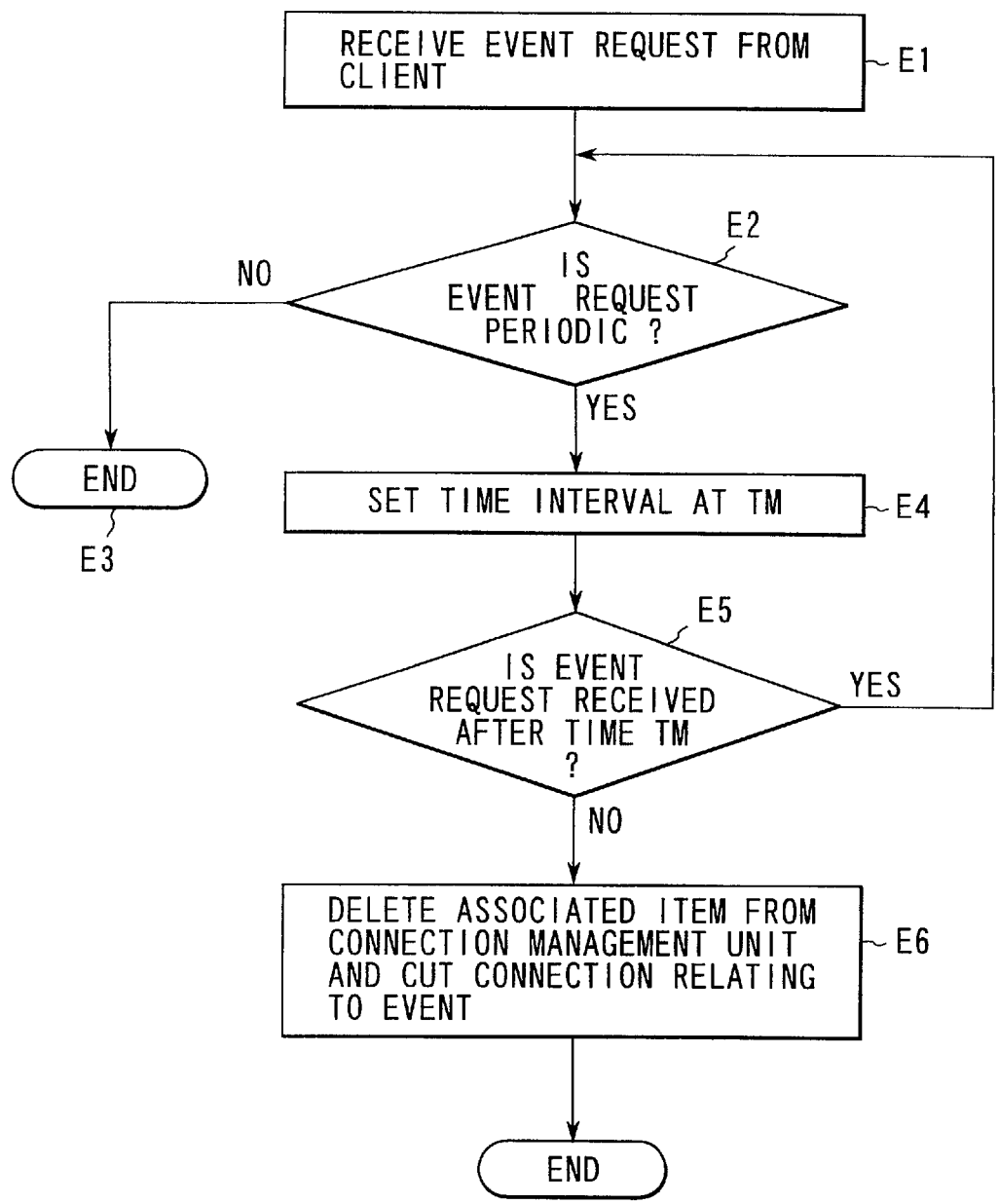
FIG. 12 is a flow chart for describing the operation of, in particular, a timer unit C of the server 20 in the system shown in FIG. 9.

The operation of, in particular, the timer unit C in the server 20 in the system of FIG. 9 will now be described with reference to the flow chart of FIG. 12.

As has been described, if the occurrence of events in the server 20 is periodic and the time interval of occurrence of the events is greater than a predetermined time, the event request is periodically sent by the timer unit A from the client 21 to the server 20. If the time of the next occurrence of the event request is known in the client 21 as in the case where the event requests are issued periodically from the client 21, the event request to which information on the time of the next occurrence of the event request is added is issued to the server 20. The timer unit C is used to check the event request to which the information on the time of the next occurrence of the event request is added, which is sent from the client 21 (i.e. the event request unit 113 in the client 21).

If the timer unit C receives the event request from the client 21 via the event request receiving unit 104 (step E1), the timer unit C determines whether the time of issuance of the next event request is described in the event request (step E2). If it is not described, the timer unit C performs nothing (step E3).

On the other hand, if the time of issuance of the next even request is described, the timer unit C sets the time at TM (step E4) and determines whether the next event request has been actually received at the time TM (step E5). If the event request has been received, the control returns to step E2 and repeats the same operations. If the event request has not been received, the associated item is deleted from the connection management unit 105 and the connection relating to this event is cut off (step E6).

The functions of the timer unit C are as follows. The timer unit C measures a set time of arrival of the event request which is to be sent from the client 21 to the server 20. If the event request has not arrived at the set time, the timer unit C determines that some fault has occurred in the network 12 or abnormality has occurred in the client 21, and cuts off the connection. If there occurred no fault or abnormality in the network 12 or client 21 and the connection was cut off due to a temporary delay in the network 12, the event request is issued once again from the client 21 by the above-described function of the timer unit B in the client 21. Therefore, the connection can be automatically resumed.

[Third Embodiment]

Figure 13:
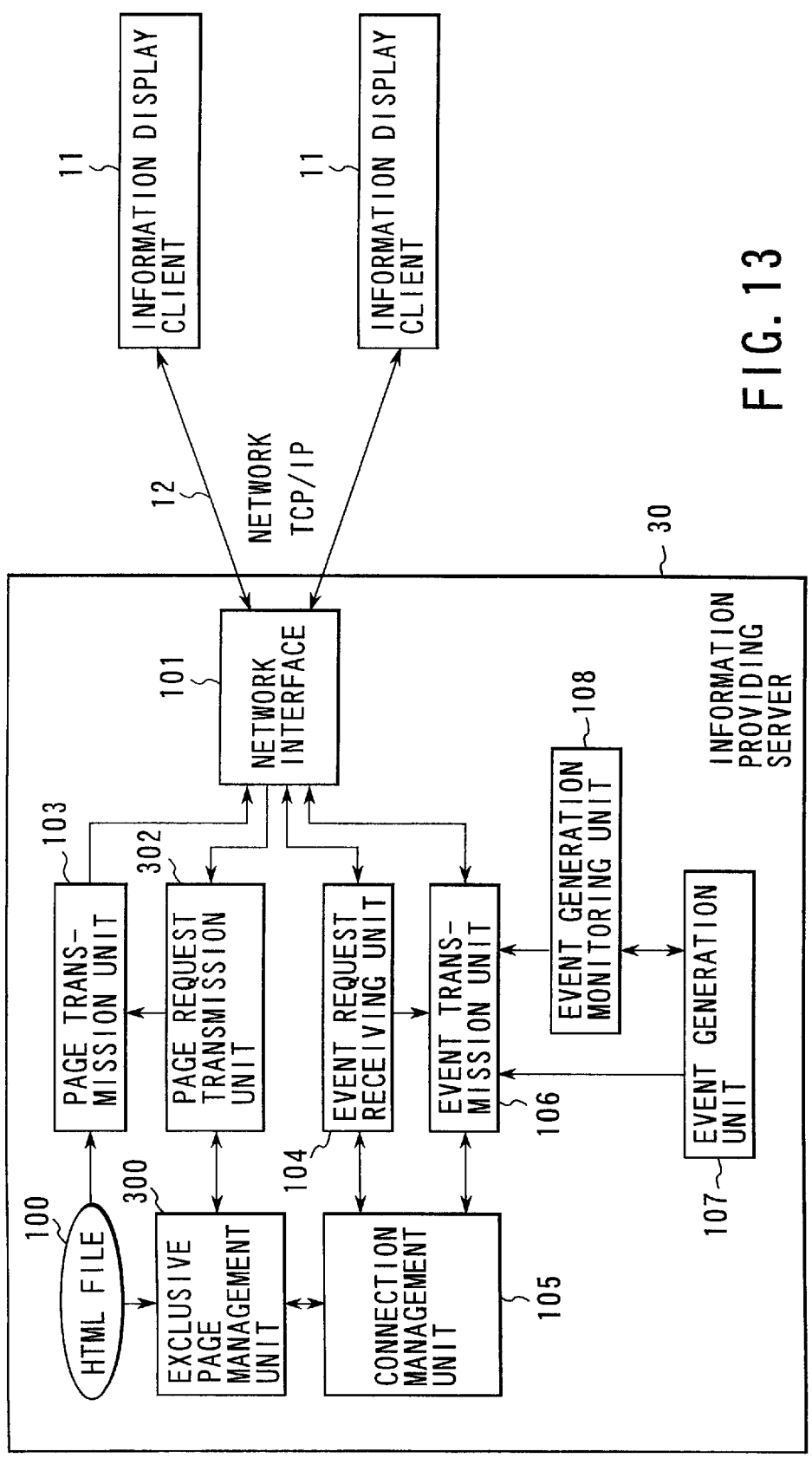
FIG. 13 is a block diagram showing the structure of a real-time information transmission system according to a third embodiment of the present invention.

FIG. 13 is a block diagram showing the structure of a real-time information transmission system according to a third embodiment of the invention. In FIG. 13, the structural parts common to those in FIG. 1 are denoted by like reference numerals.

The system in FIG. 13 differs from that in FIG. 1 in that the server 10 in FIG. 1 is replaced with a server 30 to which an exclusive page management unit 300 is added. The exclusive page management unit 300 registers sets of page identifiers (e.g. URL) for identifying pages which cannot be displayed at the same time on a plurality of clients 11, that is, exclusive pages. Where there is a client 11 waiting for display of an exclusive page, the identifier of the exclusive page as well as a queue of a client identifier of the client 11 in the waiting state are added. The exclusive page (the identifier thereof) is registered in the exclusive page management unit 300 by setting, in the page request to be sent to the server 30 from client 11, information declaring that the request page is to be used exclusively.

The exclusive page management unit 300 has a function of processing a given HTML file 100 by adding thereto a tag "EMBED" or a tag "EVENT" so as to issue a specific event request.

The system shown in FIG. 13 is characterized by using the server 30 to which the exclusive page management unit 300 is added. Thereby, as will be described later, while a certain client 11 (client A) is displaying a specific page (e.g. page P) sent from the server 30, even if another client (client B) issues the same page request to the server 30, the server 30 sends to the client B a page (e.g. page Q) different from the requested page P. The system in FIG. 13 is further characterized in that when the client A has displayed another page, the screen of the client B is automatically enabled to display the requested page (page P). Specifically, the system in FIG. 13 is characterized in that the same page cannot be displayed at the same time on a plurality of clients 11.

In this embodiment, the server 30, which is constructed by adding the exclusive page management unit 300 to the server in the first embodiment, is used, and the client 11 used in the first embodiment is used as such. However, the server 20 and client 21 used in the second embodiment may be substituted.

Figure 14:
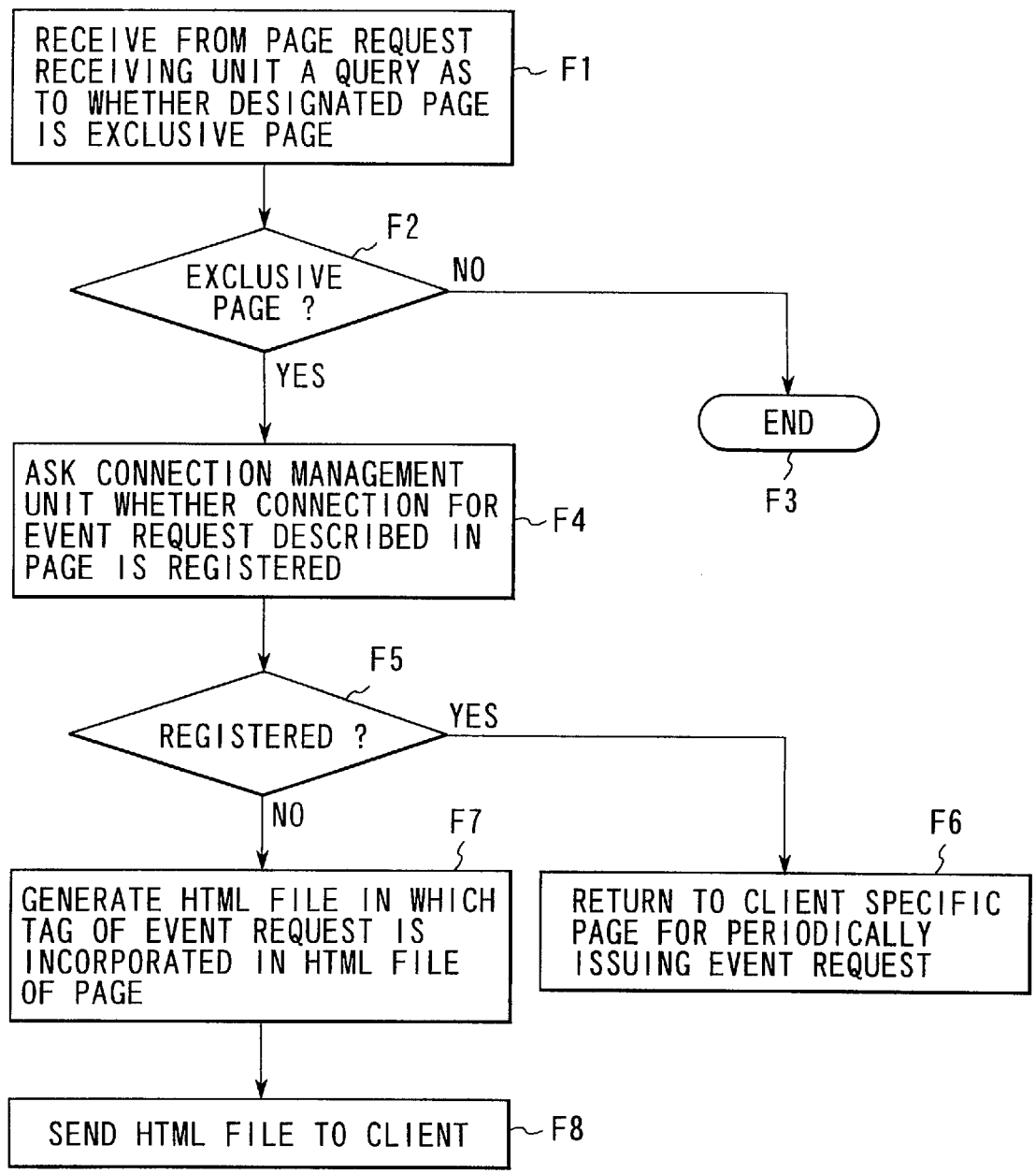
FIG. 14 is a flow chart for describing the operation of, in particular, an exclusive page management unit 300 of the server 30 in the system shown in FIG. 13.

The operation of, in particular, the exclusive page management unit 300 of the server 30 in the system of FIG. 13 will now be described with reference to the flow chart of FIG. 14.

If the page request is sent from the client 11 (client A) to the server 30, the exclusive page management unit 300 receives from the page request receiving unit 102 a query as to whether the requested page is a page registered in the exclusive page management unit 300, that is, an exclusive page (steps F1, F2). If it is not the exclusive page, the exclusive page management unit 300 performs no operation and the control ends (step F3). In this case, the requested page is told from the page request receiving unit 102 to the page transmission unit 103. The HTML file 100 corresponding to the requested page is sent from the page transmission unit 103 to the client 11 (A) at the request originating point via the network interface 101.

On the other hand, if the page requested by the client 11 (A) is the exclusive page (page P), the exclusive page management unit 300 asks the connection management unit 105 whether the connection to the event request described in the page (P) is registered (steps F4, F5). It should be noted that if the connection is registered, another client 11 (client B) has already displayed the same page (P). The exclusive page management unit 300 may register, an identifier of the client displaying the exclusive page in combination with the page identifier of this page.

Where the connection to the event request-described in the exclusive page (P) is registered in the connection management unit 105, that is, where the exclusive page (P) is displayed on the other client (B), the exclusive page management unit 300 registers the identifier of the client 11 (A) at the page request originating point in the queue combined with the identifier of the exclusive page (P). At this time, if there is no client identifier already registered in the queue, the identifier of the client 11 (A) is registered at the first position of the queue.

At the same time, the exclusive page management unit 300 tells a specific page (page Q) for periodically issuing event requests to the page transmission unit 103 via the page request receiving unit 102 and instructs the page transmission unit 103 to return the specific page (Q) to the client 11 (A) (step F6). In this case, the specific page (Q) is a page different from the target page (P) requested by the client 11 (A). It should suffice if the client 11 (A) receives the page (Q) and can determine that the requested page (P) has already been displayed on another client 11.

On the other hand, if the connection to the event request described in the exclusive page (P) is not registered in the connection management unit 105, the exclusive page management unit 300 incorporates a tag for periodically issuing event requests in the HTML file 100 corresponding to the requested page (P), and generates a new HTML file 100 (step F7). The exclusive page management unit 300 instructs the page transmission unit 103 to send the generated HTML file 100 to the client 11 (A) at the request originating point (step F8).

It should be noted that in either a case where the connection to the event request described in the requested page (P) is registered or a case where it is not registered, if the client 11 has requested the exclusive page (P), the page including the event request without fail is returned from the server.

As is clear from the description of the first and second embodiments, if the page including the event request is sent to the client, the server side can detect that the client changes the display to another page, that the network has been cut off due to some fault, or that abnormality (including a normal termination) has occurred in the client.

The same applies to cases where the client 11 which received the HTML file 100 generated in step F7 in this embodiment has changed the display to another page, abnormality has occurred in the client 11, or a fault has occurred in the network 12.

In the above cases, the server 30 can detect the abnormality since the event request cannot be sent from the client 11 or the event request cannot be sent to the server 30, despite the event request being described in the HTML file 100 sent to the client 11 at the request originating point.

As a result, the server 30 sends the event for displaying the same page as the target page (P), i.e. the page returned in step F7, to the other client 11 (B) requesting the same page (P), i.e. the client 11 (B) displaying the specific page (Q) returned in step F6. In the client 11 (B) which received this event, the screen image is changed according to the event processing result and the target page (P) is automatically displayed.

In the present embodiment, it should be noted that the client 11 (B), which has received the page generated in step F6, does not display the target page (P). In this case, since the client 11 (B) cannot display the target page, it may be considered that the client 11 (B) is in the locked state. To solve this problem, the server 30 may be provided with a function of ignoring a specific request, if such a specific request, e.g. a page request or an event request, is sent from the client 11 (B) to the server 30.

This embodiment aims at preventing simultaneous display of the same page on a plurality of clients. However, as is clear from the above description, it is possible to prevent different pages, e.g. pages A and B, from being displayed simultaneously on a plurality of clients (this is realized by judging from the number of registered clients in step F5). In addition, the number of clients which can simultaneously display a specific page is not limited to one as in this embodiment.

The functional element groups constituting the above-described server (information providing server) 10, 20, 30, or the processing procedures executed in the server 10, 20, 30, are realized by programs for enabling computers to function as an assembly of the functional element groups. Alternatively, they are realized by mounting in computers recording media such as CD-ROMs recording programs for enabling the computers to execute the processing procedures, and causing the computers to read and execute the programs. These programs may be loaded in the computers via communication media such as communication lines.

The above-described systems are applicable to control devices and OA devices connected to a network, or mobile phones and TV sets. The network in this context is not limited to a large-scale one such as the Internet. It refers to an entirety in which a plurality of functional elements are interconnected and information is exchanged among the functional elements. For example, the network may be a serial bus. Besides, a server and a client may be accommodated in one housing. An examples of this structure is a system comprising a CPU in a personal computer and a microprocessor (input/output driver) of a peripheral device. In brief, this invention is applicable to a system comprising a server for monitoring the occurrence of an event corresponding to update of information (in the case of OA equipment such as a printer, an event indicating lack of printing paper, or an event indicating lack of toner) and a client requiring such information.

As has been described above in detail, according to the present invention, a novel concept of "event request", which requests updated information of currently opened page information, has been introduced in addition to "page request". In a situation which does not permit direct communication between the information providing server and the information display client which requests information provision to the server, event notifications reflecting updated information contents are automatically sent to the client in response to a single event request from the client, each time an event corresponding to update of information on the server side, on which the information displayed on the client side is based, has occurred. Therefore, the information update on the server side can be automatically and immediately reflected on the client side.

According to the present invention, even where the time interval of information update on the server side is very short or where information update occurs asynchronously with the time of update being unknown, information update on the server side can be efficiently reflected on the screen of the client side, and the reliability and stability of communication between the server and client can be enhanced.

Furthermore, according to the present invention, an exclusive control can be performed to prevent a specific page from being simultaneously displayed on a plurality of clients.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A real-time information transmission system for transmitting information in real time from a server to a client, the system comprising:

determination means for determining, on the basis of an information transmission request from the client to the server, whether the request is a page request or an event request;

page transmission means for transmitting, if the determination means has determined that the request is the page request, information of the requested page only once from the server to the client at an originating point of the page request;

event generating means for generating events; and event transmission means for transmitting, when the determination means has determined that the request is the event request, those of the events generated by the event generating means which are associated with the event request, from the server to the client at an originating point of the information transmission request in response to the event request issued once.

2. The system according to claim 1, wherein connection between the client and the server is maintained while the event request is efficient.

3. The system according to claim 1, wherein the server transmits, in response to the page request from the client, page information in which at least one event request information unit is set for issuing the event request from the client at the originating point of the page request to the server to request updated information of the page information, and when the event request has been sent from the client to the server in accordance with the page information in which the event request information unit is set, an event notification for reflecting an updated content of the page information is transmitted from the server at a destination point of the event request to the client at the originating point of the event request, each time an event associated with update of the page information has occurred.

4. The system according to claim 1, wherein in a situation in which an event notification needs to be sent from the server to the client at an originating point of the event request each time an event has occurred in response to the event request from the client, the server monitors occurrence of the event in the server, where no event has occurred in a predetermined time period, a client state confirmation event notification is sent from the server to the client to confirm the state of the client at the originating point of the event request, and when the even notification has been sent from the server, the server confirms whether the even notification has been successful, and if the event notification has failed, a network connection used for the event notification is cut off on the server side.

5. The system according to claim 1, wherein a predetermined procedure to be executed by the client is set in page information in which information on the event request is set, which page information is transmitted from the server in accordance with the page request from the client, whereby when the client, which has received the page information in which the event request is set, changes display of the page information to display of page information corresponding to another page request, the client cuts off network connection associated with an event notification from the server in response to the event request, according to the predetermined procedure.

6. The system according to claim 1, wherein information indicating whether occurrence of an associated event is periodic or non-periodic, information on a time interval if the occurrence of the event is periodic and a predetermined procedure to be executed by the client are set in page information in which information on the event request is set, which page information is transmitted from the server in accordance with the page request from the client, whereby when the occurrence of the associated event is periodic and the time interval thereof is greater than a predetermined time, the client which has received the page information, in which the event request information is set, temporarily cuts off network connection each time the client receives an event notification from the server in response to the event request, according to the predetermined procedure in the page information, and also the client executes an operation to issue the event request once again after an event generation scheduled time set by the time interval has arrived.

7. The system according to claim 1, wherein a predetermined procedure to be executed by the client is set in page information in which the event request information is set, which page information is sent from the server in response to the page request from the client, or in an event notification transmitted from the server in response to the event request from the client, and time information on occurrence of the same event occurs is set in the event notification, whereby the client, which has received the event notification, is caused to monitor the arrival of the next event notification according to the predetermined procedure, and to issue the event request to the server where the client could not receive the next event notification from the server at a set time indicated in the time information in the received event notification.

8. The system according to claim 1, wherein a procedure for adding time information for issuing a next event request to the event request issued by the client is set in page information in which the event request information is set, which page information is sent from the server in response to the page request from the client, whereby when the event request has been issued from the client to the server, the server monitors arrival of the next event request from the client, and cuts off network connection relating to the event request, if the server could not receive the next event request at a set time indicated in the time information in the preceding event request.

9. The system according to claim 1, wherein information on an exclusive page, which is prohibited from being displayed simultaneously on a plurality of clients, is registered in the server, where the server has received the page request from the client, the server determines whether the requested page is an exclusive page, on the basis of the registered information of the exclusive page, if the request page is the exclusive page, the server determines whether the page is being displayed on another client, if the page is not being displayed on said another client, new page information, in which the event request information is set in the requested page information, is sent to the client at the originating point of the page request, if the page is being displayed on said another client, specific page information, in which specific event request information for issuing a specific event request is set, is sent to the client at the originating point of the page request, instead of the requested page information, and the client is caused to wait for display of the requested page information, and where network connection relating to an event notification from the server to the client which is in the state of displaying the exclusive page is cut off and there are clients which are in the state of waiting for display of the exclusive page, new page information, in which the event request information is set in the requested page information, is sent to one of the clients waiting for the display of the exclusive page as a response to the specific event request.

10. The system according to claim 9, wherein where the page request or the event request has been sent to the server from the client which is in the waiting state, processing of the request in the server is changed from normal state.

11. An information providing server for transmitting page information requested by a page request from an information display client to the client via a network, the server comprising:

request determination means for determining, when a request for information provision has been sent from the client, whether the request is a page request for requesting new page information or an event request for requesting updated information;

page information transmission means for transmitting, when the request is the page request, requested page information only once from the server to the client at an originating point of the page request; and event transmission means for transmitting, when the request is the event request, an event notification for updating associated page information each time an event corresponding to the associated page information has occurred.

12. A real-time information transmission system comprising:

a control device;

a server connected to the control device, the server including, page request receiving means for receiving a page request, page transmission means for transmitting a page requested to the page request receiving means, event request receiving means for receiving an event request, event generating means for generating an event representing at least a state of the control device, connection management means for managing kinds of events requested to the event request receiving means and managing connection with an originating point of the event request, and event transmission means for transmitting a plurality of events generated successively from the event generating means to the originating point of the event request, while the connection with the originating point of the event request is maintained; and a client connected to the server via a network, the client including, page request means for requesting a page to the server, page receiving means for receiving a page sent from the server, event request means for requesting an event to the server, event receiving means for receiving a plurality of events from the server in response to a single event request from the event request means, and display means for displaying the page received by the page receiving means and displaying information based on the event received by the event receiving means.

* * * * *

UNITED STATES PATENT AND TRADEMARK OFFICE
CERTIFICATE OF CORRECTION

PATENT NO. : 6,480,883 B1
DATED : November 12, 2002
INVENTOR(S) : Tsutsumitake

It is certified that error appears in the above-identified patent and that said Letters Patent is hereby corrected as shown below:

Column 20,
Lines 50 and 51, change "even" to -- event --.

Signed and Sealed this

Eighth Day of April, 2003

JAMES E. ROGAN
*Director of the United States Patent and Trademark Office*